(12) United States Patent
Tabak et al.

(10) Patent No.: US 9,030,293 B1
(45) Date of Patent: May 12, 2015

(54) SECURE PASSCODE ENTRY

(75) Inventors: Joshua Abraham Tabak, Seattle, WA (US); Kenneth Russell Carter, Los Altos, CA (US)

(73) Assignee: Google Inc., Mountain View, CA (US)

( * ) Notice: Subject to any disclaimer, the term of this patent is extended or adjusted under 35 U.S.C. 154(b) by 354 days.

(21) Appl. No.: 13/463,867

(22) Filed: May 4, 2012

(51) Int. Cl.
   *G06F 21/30* (2013.01)

(52) U.S. Cl.
   CPC .................................. *G06F 21/30* (2013.01)

(58) Field of Classification Search
   CPC ...................................................... G06F 21/30
   USPC ..................................... 340/5.54, 5.85, 5.27
   See application file for complete search history.

(56) References Cited

U.S. PATENT DOCUMENTS

| | | | | |
|---|---|---|---|---|
| 4,333,090 A | * | 6/1982 | Hirsch | 380/52 |
| 4,962,530 A | * | 10/1990 | Cairns | 713/183 |
| 5,274,370 A | * | 12/1993 | Morgan et al. | 340/5.54 |
| 5,276,314 A | * | 1/1994 | Martino et al. | 340/5.27 |
| 5,428,349 A | * | 6/1995 | Baker | 340/5.54 |
| 5,774,059 A | * | 6/1998 | Henry et al. | 340/5.54 |
| 5,815,083 A | * | 9/1998 | Patarin et al. | 340/5.27 |
| 6,421,453 B1 | | 7/2002 | Kanevsky et al. | |
| 2001/0039619 A1 | | 11/2001 | Lapere et al. | |
| 2003/0208697 A1 | | 11/2003 | Gardner | |
| 2003/0210127 A1 | * | 11/2003 | Anderson | 340/5.27 |
| 2007/0133770 A1 | * | 6/2007 | LaPierre et al. | 379/142.01 |
| 2008/0005340 A1 | * | 1/2008 | Herley et al. | 709/229 |
| 2009/0259588 A1 | | 10/2009 | Lindsay | |

FOREIGN PATENT DOCUMENTS

WO    2008080228 A1    7/2008

* cited by examiner

*Primary Examiner* — Edwin Holloway, III
(74) *Attorney, Agent, or Firm* — Morris & Kamlay LLP

(57) ABSTRACT

Methods and devices for presenting a secure passcode system to a user are disclosed. The methods and devices may include a security prompt displayed to a user, wherein the prompt comprises a sequence of passcode elements. The passcode elements may comprise both response-eligible and response-ineligible passcode elements. The security prompt may receive an input from a user and determine whether the response is correct. A correct response may include each of the response-eligible passcode elements and none of the response-ineligible passcode elements. If a correct response is received, the security prompt may permit further access to a function.

30 Claims, 4 Drawing Sheets

SECURE PASSCODE ENTRY

BACKGROUND

Electronic devices, such as smart phones, personal digital assistants, laptop computers, tablet computing devices, automated teller machines, transaction card readers and the like often require a user to enter a passcode in order to use the device. For example, when using a transaction card reader to perform a debit card transaction, the card user may be prompted to enter a personal identification number (PIN) via a keypad. Similarly, a user of a smart phone may secure the device with a passcode, and the device may require the user to enter the passcode before the device will allow the user to access the device's resources.

A problem with standard passcode entry interfaces is that an observer who watches the user enter each passcode element (i.e., a number, a letter and/or the like) into the interface may discover the user's passcode. In addition, if a user of a device does not periodically change the passcode, an observer could look for physical markers of passcode entry (such as finger-oil residue) and use those markers to discern the passcode.

This application describes methods and systems that may address issues such as those described above.

SUMMARY

In an embodiment, a method is disclosed. The method, which is performed by an electronic device, includes presenting a security prompt to a user, wherein the security prompt comprises a sequence of passcode elements comprising at least one response-ineligible passcode element and at least one response-eligible passcode element. The method further includes receiving a response to the security prompt via an interface of the electronic device, determining whether the response is a correct response, and permitting the user to access a function of the electronic device. The determining may further include determining whether the response includes each of the response-eligible passcode elements and omits each of the response-ineligible passcode elements.

In an embodiment, an electronic device is disclosed. The electronic device comprises a processor, a user interface and a memory. The memory contains programming instructions that, when implemented by the processor, cause the processor to implement a security function. The security function comprises presenting a security prompt to a user, wherein the security prompt comprises a sequence of passcode elements comprising at least one response-ineligible passcode element and at least one response-eligible passcode element. The security function further comprises detecting that the user interface has received a response to the security prompt, determining whether the response is a correct response by determining whether the response includes each of the response-eligible passcode elements and omits each of the response-ineligible passcode elements, and in response to receiving the correct response, permitting the user to access a device function of the electronic device.

In an embodiment, a security module for an electronic device is disclosed. The security module comprises a computer-readable medium containing program instructions. The program instructions cause the electronic device to present a security prompt to a user, wherein the security prompt comprises a sequence of passcode elements comprising at least one response-ineligible passcode element and at least one response-eligible passcode element. The program instructions further cause the electronic device to receive a response to the security prompt via an interface, determine whether the response is a correct response by determining whether the response includes each of the response-eligible passcode elements and omits each of the response-ineligible passcode elements, and in response to receiving the correct response, permit the user to access a function of the electronic device.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

An "electronic device" or "securable electronic device" as used herein may generally comprise any electronic device capable of having an ability to be securable. Examples of electronic devices may include, but are not limited to, smart phones, personal digital assistants, laptop computers, tablet computing devices, automated teller machines, transaction card readers, electronic lock systems containing a soft keypad and the like, or remote access devices such as garage door openers and wireless vehicle security systems that may further contain a remote mechanical component. The systems and methods described herein may be used as a sole method of securing an electronic device, or may be used in conjunction with, in addition to, or as an alternative to other security features. The use of multiple security features, frequently termed "layering," may be used to secure access to highly sensitive information. Examples of other security features may include, but are not limited to, biometric data readers (fingerprint readers and/or retina scanners) or authorization tokens (random password generators) for both online and offline access.

A "passcode" or "passcode element" may generally comprise a response-eligible passcode element or a response-ineligible passcode element. The response-ineligible passcode element may be a passcode element that is pre-selected by a user to be omitted or replaced during passcode entry, as described herein. Conversely, the response-eligible passcode element may be a passcode element that is not pre-selected by a user, but must be entered by the user during passcode entry, as described herein. Passcode elements may include characters, graphics or icons, such as response-eligible characters and response-ineligible characters, and may generally be items that are graphically displayed on a display. Passcode elements may further include items that are not graphically displayed, such as audio tones or haptic emissions.

Figure 1:
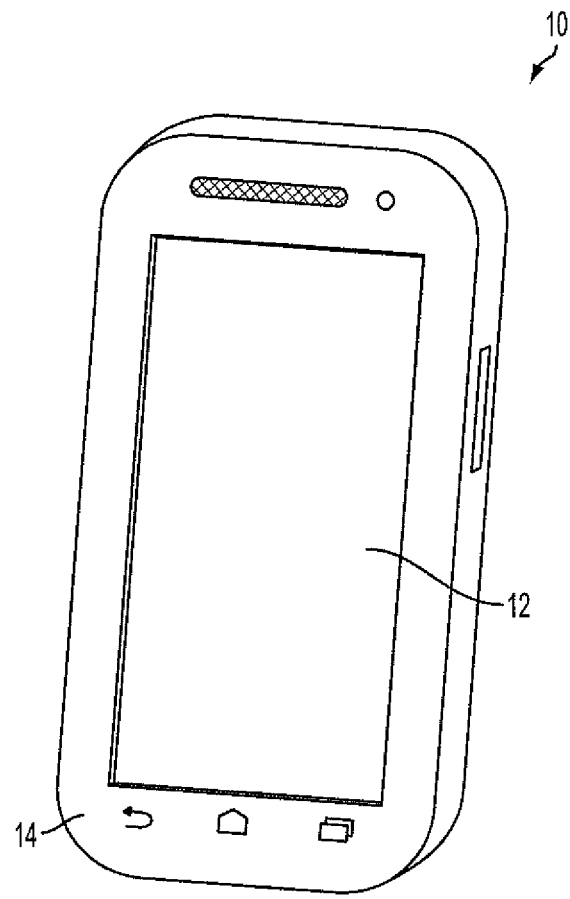
FIG. 1 illustrates a perspective view of an electronic device according to an embodiment of the present disclosure.

FIG. 1 illustrates an example of a securable electronic device 10. In this document, a securable electronic device refers to an electronic device that includes a processor, a computer-readable memory, and a user interface such as a keyboard, keypad or touch screen. Securable electronic devices may include, for example, smart phones, digital cameras, personal digital assistants, laptop computers, tablet computing devices, media players, GPS navigation units, in-dash automotive components, automated teller machines, transaction card readers and the like. The electronic device 10 may include a processor and a memory that stores programming instructions, such as a software application, that implements the methods and systems described herein.

The electronic device 10 may be securable by the software application so that unauthorized users of the electronic device 10 will be unable to gain access to functions of the device. Certain functions may include, but are not limited to, turning on the device, accessing applications stored in the memory of the device, as well as certain portions of the applications, accessing specific websites, and accessing certain electronic device hardware components, such as a camera.

The electronic device 10 may further have a display 12. The display 12 may generally be a device for displaying images, text, video, and the like. The display 12 may further be adapted to display the images, text, video and the like according to commands received from the processor. Examples of displays may include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The display 12 may further include a touch sensitive screen, wherein the touch sensitive screen may act as a user interface device. The touch sensitive screen may receive contact-based inputs from a user, such as from a user's fingers. The touch sensitive screen may be adapted for gesture control, thus allowing for a user to tap, pinch, swipe, or provide other similar gestures to elicit commands to the device 10. The touch sensitive screen may further be capable of sending signals to the processor based upon elements displayed on the display 12 and the location and type of gesture used. Examples of touch sensitive screens may include, but are not limited to, resistive touchscreens, capacitive touchscreens, infrared touchscreens and/or other technologies now known or later developed. Alternatively or in addition to a touch-resistive screen, the electronic device may include one or more buttons, keys, or switches 14, which optionally may be part of a keyboard or keypad, to serve as a user input interface.

The electronic device 10 may further comprise one or more haptic feedback emission devices. The haptic feedback emission devices may provide a haptic emission, such as a vibrating signal to a user. The haptic emission may further be emitted at a number of intervals and for a period of time. In addition, the haptic feedback emission devices may receive commands from the processor. The commands may include instructions for the intervals at which the haptic emissions should occur, the length (in time) of each haptic emission and/or a type of haptic emission such as an intensity of the vibration.

Figure 2:
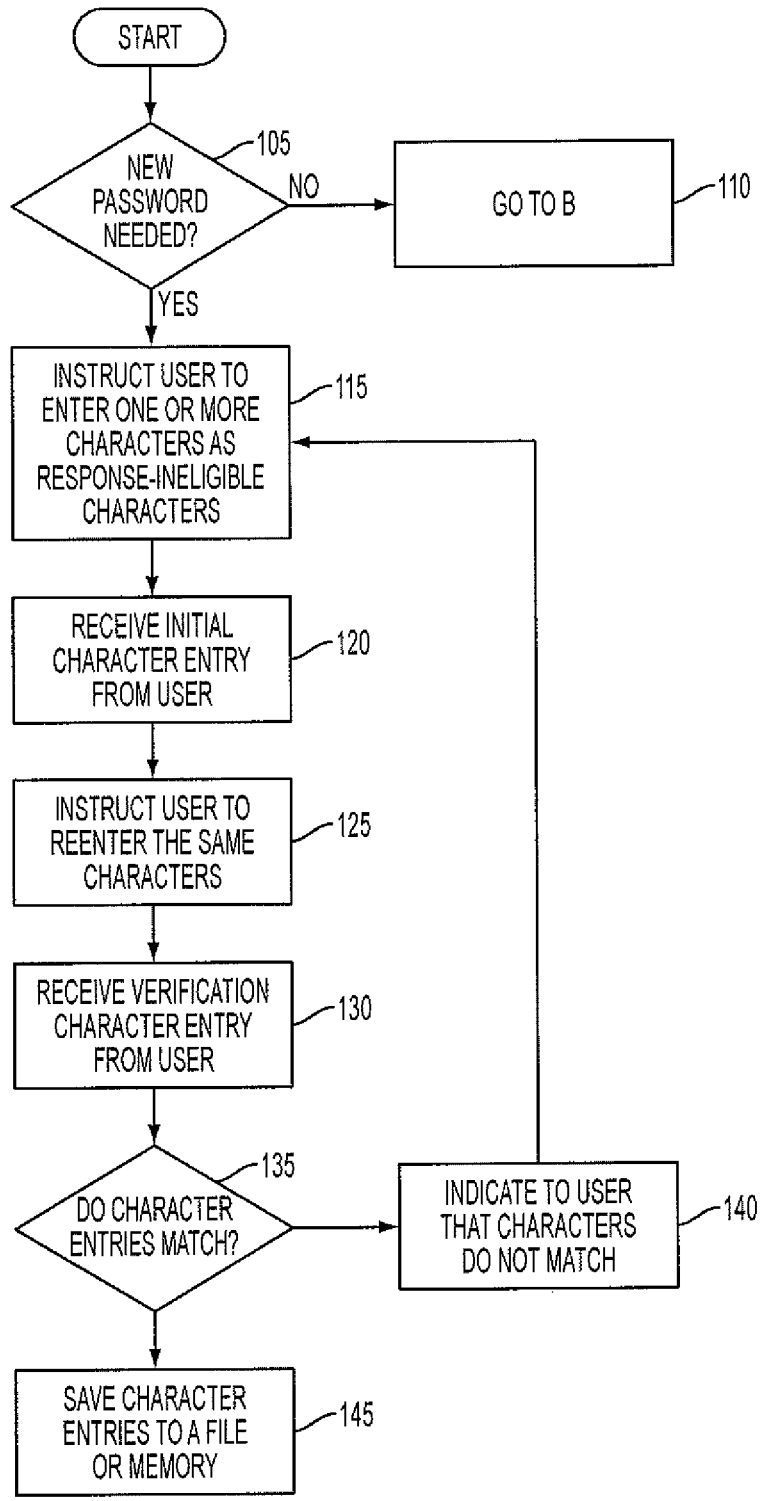
FIG. 2 is a flowchart of a method for setting a passcode in accordance with an embodiment of the present disclosure.

The programming instructions, such as the software application, may implement a passcode-setting process, as shown in FIG. 2. The process establishes a set of response-ineligible characters. Then, after the passcode is set, the device will present a passcode to a user with both response-eligible characters and response-ineligible characters, receive a response from the user, and permit access to a resource of the device only if the user's response includes the response-eligible characters but omits the presented response-ineligible characters.

When generating the passcode-setting prompt, the application may generate a passcode, such as by using a randomization function to randomly generate two or more characters, wherein the two or more characters may comprise one or more response-ineligible characters and one or more response-eligible characters 215. The system may then display the two or more randomly generated characters on the display 220. In general, the system may be increasingly more secure and less susceptible to unauthorized access as the number of displayed response-ineligible characters increases.

This passcode-setting prompt may generally be completed the first time a device or an application is used, at an interval since the last time the system was completed (e.g., security protocol may require the system be completed every 30 days), or whenever a user requests to change the passcode. The passcode setting prompt may additionally contain an option to bypass the system described herein in the event that a user desires not to have passcode protection enabled on the electronic device.

The passcode-setting prompt may generally contain a series of steps that are implemented by the electronic device to instruct a user to secure access to the device, applications or websites on the device, and/or the like. The steps may comprise a method as described below.

A first step may be to determine whether a new passcode is needed 105. This determination may be completed by further determining whether a passcode has been set in the past or whether it is necessary or desirable for a new passcode to be created due to user request or if a certain time has elapsed, as explained herein. If a passcode has already been set and/or a new passcode does not need to be created, the system may proceed to a security prompt 110.

If a passcode has not previously been set and/or a new passcode needs to be created, the system may instruct a user to enter one or more characters as response-ineligible characters 115. Response-ineligible characters may generally be any number, letter (lowercase or uppercase), symbol, specific gesture or swipe patterns, sound patterns (such as spoken words, letters or numbers) and/or the like. Response-ineligible characters may be entered by a user on the user interface, such as an input device keyboard, keypad, microphone or touchscreen. Entry of response-ineligible characters may be done via a data entry field, by a user selection from a set of candidate characters, or by another mechanism. In some embodiments, the user may be required to identify a minimum number of response-ineligible characters, and/or the user may be limited to a maximum number of response-ineligible characters.

The response-ineligible characters may additionally be other objects that may be easier to see for some users, such as users with low vision. Examples of other objects may include drawings, photographs, shapes, blocks of color, and the like.

Response-ineligible characters may generally be defined as characters, when they appear on the display during a security prompt as described herein, are recognized by an authorized user as characters that do not belong with the remaining characters displayed on the screen. Accordingly, the authorized user knows not to input the response-ineligible characters as a portion of the passcode at the security prompt. Conversely, an unauthorized user will not be able to recognize and distinguish the response-ineligible characters when they appear on the display, and may enter them as a portion of the passcode at the security prompt.

As an alternative to the above, the system may present one or more haptic emissions to the user in lieu of graphical characters. The haptic emissions may be adapted for users who are unable to perceive the graphical characters, such as visually-impaired users.

The haptic emissions may represent different "characters" by varying the length and frequency of each haptic emission. For example, haptic emissions may resemble Morse code transmissions by using a dash and dot combination for each letter of the alphabet, wherein a Morse code dash may be characterized by a long haptic emission (such as approximately 2 seconds), whereas a Morse code dot may be characterized by a short haptic emission (such as approximately 500 milliseconds).

The system may be configured to direct a user to choose lengths and frequencies of haptic emissions to serve as response-ineligible characters. Lengths and frequencies of haptic emissions may be chosen by tapping the touch sensitive screen for a length and frequency desired by the user. As an alternative, the device may produce haptic emissions of varying length and frequency until a user selects the desired haptic emission.

The quantity of response-ineligible characters may be predetermined by the software application implementing the passcode-setting system, may be set by a security administrator, or may be decided by the user completing the steps herein.

The system may instruct the user to enter one response-ineligible character at a time. For example, a user may be instructed to enter a character and provide some indication that a character has been entered, such as pressing a "next" button, providing a swiping gesture across the device screen, shaking the device, and/or the like.

Alternatively, the system may instruct the user to enter two or more response-ineligible characters at a time, which may additionally include instructing the user to enter all of the response-ineligible characters at once.

Once all of the response-ineligible characters have been received 120, the system may instruct the user to re-enter the same characters as a verification step 125. As with the initial character entry, the user may be instructed to enter one character at a time, multiple characters at a time, or all characters at once. The system may receive the verification entries from the user 130 and then verify that the initial entries and verification entries match 135. If the characters match, the system may store the entries to a file for future reference 145.

If the characters do not match, the system may provide an indicator to the user that the characters do not match 140, and the process may repeat until the system receives matching initial entries and verification entries.

As an alternative, the system may instruct the user to enter each character and then instruct the user to verify each character before moving on to instruct the user to enter and verify a second character, and so on until all characters have been entered and verified. Similarly, the system may instruct the user to enter a subset of characters and then instruct the user to verify each subset of characters before moving on to a second subset, and so on until all characters have been entered and verified.

The system may additionally be configured to instruct a user to enter one or more proxy characters to be used. The proxy characters may be distinct from the response-ineligible characters, and may generally be any number, letter (lowercase or uppercase), symbol, and/or the like, and may be entered by a user on the user interface, such as an input device keyboard, keypad or touchscreen. The proxy characters may additionally be other objects such as drawings, photographs, shapes, colors, and the like. Optionally, a proxy character may be a second response-ineligible character that becomes an eligible character only when used as a proxy for the first response-ineligible character.

Proxy characters may generally be defined as characters known by an authorized user as characters that are to be used in lieu of response-ineligible characters when entering the passcode at the security prompt, instead of omitting the response-ineligible characters, as described herein. Conversely, an unauthorized user will not know the proxy characters, and thus will be unable to correctly enter the passcode at the security prompt.

A proxy character may be mapped or defined to correspond to a single response-ineligible character, or alternatively may be mapped or defined to correspond to multiple response-ineligible characters. In instances where a single proxy character is mapped to correspond to a single response-ineligible character, the system may also allow for some response-ineligible characters to have no proxy character mapped or defined to correspond to it. As a result, the system may provide a security prompt comprising both response-ineligible characters that have a corresponding proxy character, and those that do not have a corresponding proxy character, as described in more detail hereinafter.

The system may automatically define replacement rules for when proxy characters are to be entered by the user. For example, the system may be configured to always require a proxy character to be entered in lieu of a response-ineligible character, or may be configured to randomly require proxy characters during some password entry sessions, but not at others. If the system is configured to randomly require proxy characters at some password entry sessions, the system may additionally be configured to notify the user whether proxy characters are to be used or are not to be used. Such a notification may be a graphical notification on the display such as text or images, an audio notification such as beeps or tones, or a haptic notification such as vibrations. Additional notification mechanisms may be used, such as by presenting the first character of the presented password as response-ineligible character, or by leading the presented password with a character that the user will know signals an instruction to use proxy characters.

Alternatively, the system may provide the user with a prompt or an option for setting or defining replacement rules for when proxy characters are to be used. For example, the system may give the user an option to always use proxy characters in lieu of response-ineligible characters during password entry sessions, to randomly require proxy characters during some password entry sessions, or to never use proxy characters. If the user selects an option to never use proxy characters, the system may not require the user to define the proxy characters, as described herein. Such a user prompt for selecting the frequency of using proxy characters may be provided by the system to the user during the passcode selection process as described herein, or may additionally be provided by the system to the user to be changed at any time, such as via a settings menu and/or the like.

Figure 3:
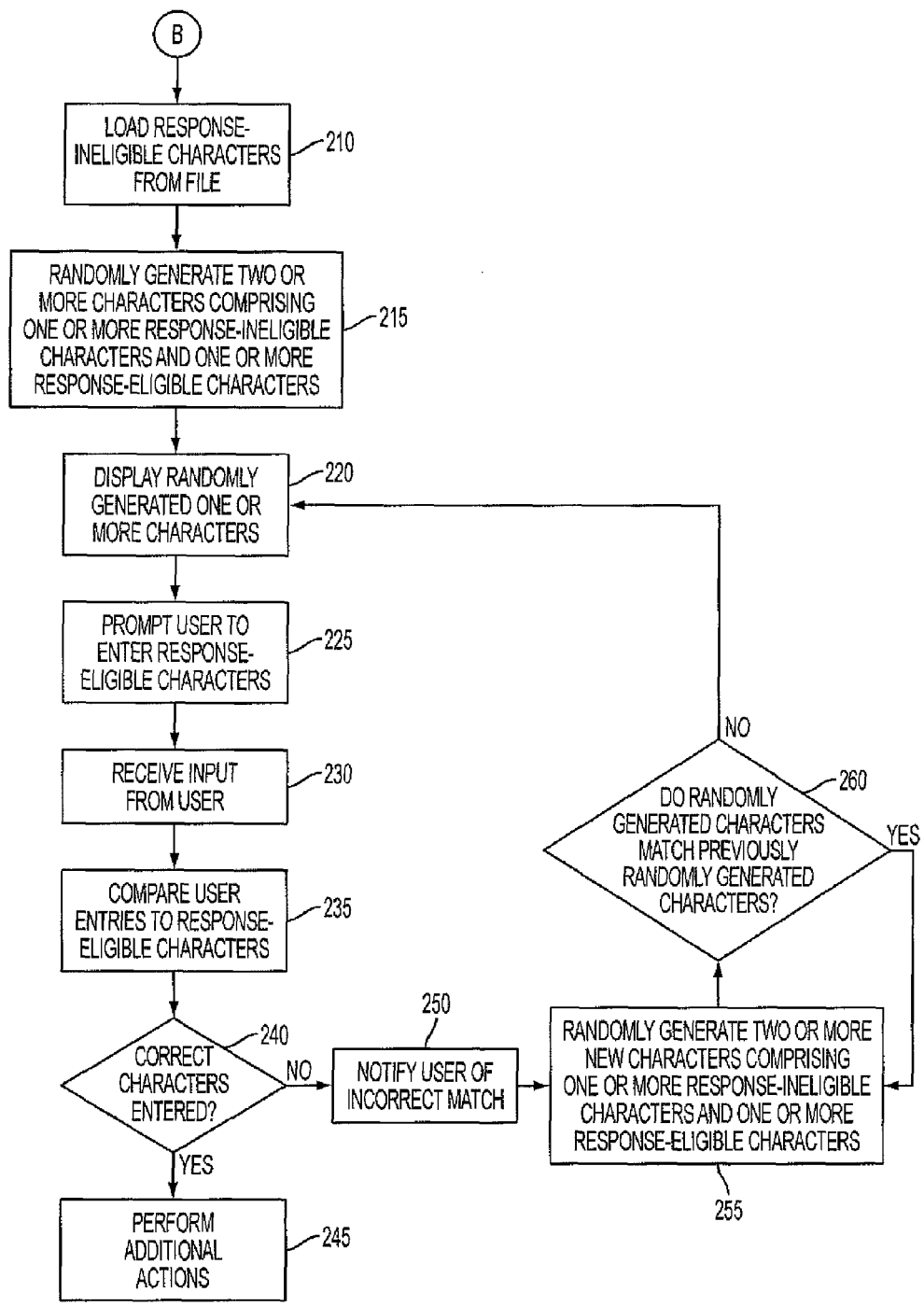
FIG. 3 is a flowchart of a method for verifying a user by means of passcode entry in accordance with an embodiment of the present disclosure.

The programming instructions, such as the software application, may implement a security prompt, as shown in FIG. 3. The programming instructions may generally utilize the security prompt every time the device is turned on or awakened from an idle state, every time an application or portion of an application is launched, every time a website is accessed, after an amount of time has elapsed and/or the like.

The security prompt may generally contain a series of steps that are implemented by the electronic device to verify that the user is authorized to access the device, applications or websites on the device, and/or the like. The steps may comprise a system as described below.

The system may access the response-ineligible characters from the file or memory 210 at the location they were stored during the passcode-setting prompt. The system may then generate a passcode, such as by using a randomization function to randomly generate two or more characters, wherein the two or more characters may comprise one or more response-ineligible characters and one or more response-eligible characters 215. The system may then display the two or more randomly generated characters on the display 220. In general, the system may be increasingly more secure and less susceptible to unauthorized access as the number of displayed response-ineligible characters increases.

The system may display the two or more randomly generated characters simultaneously on the display for the user to review and make a determination as to which characters are response-eligible, and which characters are response-ineligible. As an alternative, the system may display the two or more randomly generated characters sequentially. Wherein the two or more randomly generated characters are displayed sequentially, the system may receive an input from the user containing only response-eligible and/or proxy characters in the same sequence as they were presented by the system, as further described herein.

Response-eligible characters may generally be defined as characters, when they appear on the display, are recognized by an authorized user as characters that are to be entered as the passcode. Accordingly, the authorized user knows to input the response-eligible characters when entering the passcode at the security prompt. Conversely, an unauthorized user will not be able to recognize and distinguish the response-eligible characters when they appear on the display, and may omit one or more of them as a portion of the passcode at the security prompt.

Proxy characters may or may not be generated as one or more of the randomly generated characters on the display. When a proxy character is randomly generated, the system may treat the proxy characters as if it is a response-eligible character, as described herein.

After displaying the characters, the system may then instruct the user to enter all of the response-eligible characters and omit the response-ineligible characters 225. The system may additionally present a virtual keyboard, keypad, and/or the like for character entry. While it may appear to an unauthorized user that the passcode will be those characters that are presented on the display, an authorized user will know to omit the response-ineligible characters and only input the portion of the passcode that is made of response-eligible characters.

As an alternative, the system may instruct the user to merely enter a passcode without providing any explanation with regards to the response-eligible characters, the response-ineligible characters, and optionally, the proxy characters. As another alternative, the system may provide a false instruction, such as an instruction to the user to enter all of the characters as presented. Accordingly, an authorized user would be expected to know about the response-eligible and response-ineligible characters and would ignore or disregard the instructions presented on the screen, while an unauthorized user would not be aware of this. Furthermore, if an unauthorized user heeds the false instruction and enters the characters as presented on the screen, the system may be adapted to automatically go into a "lockdown" state or one of the alternatives as described herein.

The system may receive an input from the user 230 via the user interface and compare the input to the randomly generated response-eligible characters 235. The system may then make a determination whether the input is correct 240. The input may be correct if it contains all response-eligible characters and no response-ineligible characters. The input may be incorrect if it contains any response-ineligible characters, or if it does not contain some of the required response-eligible characters (i.e., one or more response-eligible characters have been omitted), or if the characters are not entered in the proper sequence.

The system may recognize a correct input if all response-eligible characters and no response-ineligible character are entered, and further if all response-eligible characters are entered in the same sequence as they were presented on the screen to the user. Alternatively, the system may allow for a correct input if all response-eligible characters and no response-ineligible characters are entered, regardless of whether the response-eligible characters are in the same sequence as they were presented on the screen to the user.

If proxy characters have been specified by the user, as described hereinabove, the system may recognize a correct input if all response-eligible characters have been entered, and all of the response-ineligible characters have been replaced by the user with one or more proxy characters.

In instances where a portion of the response-ineligible characters correspond to a proxy character, and a portion of the response-ineligible characters do not correspond to a proxy character, the system may recognize a correct input if the correct proxy character or characters are entered in lieu of the response-ineligible characters with a corresponding proxy character and the remaining response-ineligible characters are omitted.

The proxy characters may or may not be displayed during passcode generation. However, if the proxy characters are displayed, an authorized user may recognize them and treat them as if they were response-eligible characters and as normal proxy characters. Accordingly, the authorized user may enter the proxy characters in lieu of the response-ineligible characters, and also enter them where they appear as response-eligible characters.

If the device is configured for haptic emissions as described above, the system may present a series of haptic emissions to the user in lieu of graphical based characters. The user may select which haptic emissions are deemed response-eligible and response-ineligible by tapping the touch sensitive screen after each emission is presented. For example, the user may tap once if an emission is response-eligible, or tap twice if an emission is response-ineligible. Alternatively, a series of one or more haptic emissions may be presented to the user all at once, and the user must tap and/or tap and hold the screen to mimic the length and frequency of the response-eligible choices, while omitting taps for the response-ineligible choices.

If the system determines that the input is correct, additional actions may be performed 245. Such additional actions may include unlocking the electronic device so that it can be used by a user, granting user access to an application, a website, a device hardware component, a remote mechanical component (such as unlocking a vehicle door) and/or the like.

If the system determines that the input is incorrect, it may provide a notification of an incorrect match to the user 250. Examples of incorrect match notifications may include a text box or image shown upon the display, an audio signal, haptic feedback and the like, or any combination thereof. The system may then proceed to utilize the randomization function to randomly generate one or more new characters comprising one or more response-ineligible characters and one or more response-eligible characters 255.

Before displaying the newly generated one or more new characters, the system may perform an additional step of verifying that the randomly generating one or more new characters is not identical to the previously randomly generated one or more characters 260. If the randomly generated one or more new characters is identical to the previously randomly generated one or more characters, the system may randomly generate another one or more characters 255 and repeat the process until the characters generated are different from the previously generated characters. Once the randomly generated one or more characters are allowable, the system may display the one or more characters 220 and the security verification process may repeat.

The system may additionally be configured so that it will only allow an incorrect input a number of times. For example, if a user incorrectly enters an input three times, the system may cause the device to go into the "lockdown" state wherein it may not allow further user inputs for a period of time. In addition to, or as an alternative to a "lockdown" state, the system may cause the device to perform other tasks, such as erasing the memory on the device, dialing a phone number, sending a text message or email, activating a GPS radio to send and/or receive GPS signals, and/or the like. While the above example allows for an incorrect input three times, those skilled in the art may appreciate that the system may allow for an incorrect input any number of times, including a single incorrect input.

Figure 4:
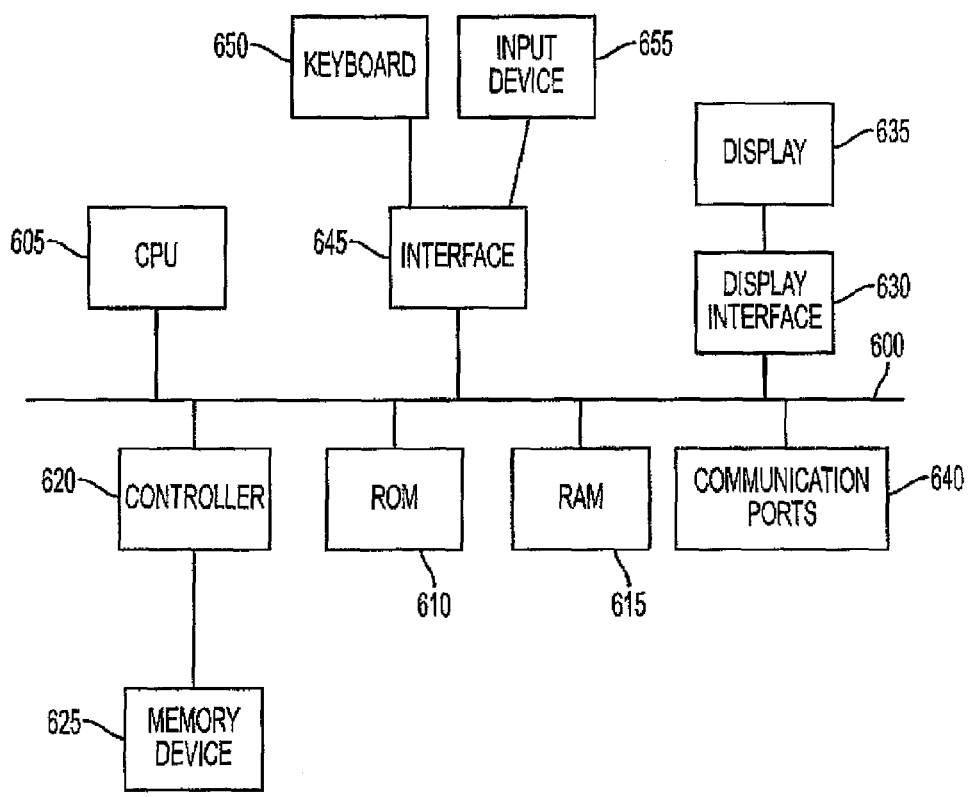
FIG. 4 is a block diagram illustrating elements that may be included in a computer system.

FIG. 4 depicts a block diagram of internal hardware that may be used to contain or implement the various services and processing devices as discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 4, is a processing device, computing device or processor as such terms are used within this disclosure. Read only memory (ROM) 610 and random access memory (RAM) 615 constitute examples of memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
by an electronic device, presenting a security prompt to a user, wherein the security prompt comprises a sequence of passcode elements, wherein the sequence comprises at least one response-ineligible passcode element and at least one response-eligible passcode element, wherein:
at least one of the response-eligible passcode elements comprises a first haptic emission;
at least one of the response-ineligible passcode elements comprises a second haptic emission that differs from the first haptic emission in length, frequency, or both length and frequency; and
presenting the security prompt to the user comprises causing the electronic device to emit the first and second haptic emissions;
receiving, via an interface of the electronic device, a response to the security prompt;
determining, by the electronic device, whether the response is a correct response by determining whether the response includes each of the response-eligible passcode elements and omits each of the response-ineligible passcode elements based on the length, frequency, or both length and frequency of inputs received via a touch-sensitive screen of the electronic device, and wherein the correct response consists of the sequence of passcode elements with a proxy element replacing each of the response-ineligible passcode elements; and
in response to receiving the correct response, permitting the user to access a function of the electronic device.

2. The method of claim 1, further comprising, by the electronic device:
before the presenting, generating the security prompt, wherein the generating comprises using a randomization function to generate the security prompt.

3. The method of claim 1, further comprising:
before the presenting, generating the security prompt, wherein generating comprises ensuring that the security prompt does not match an immediately-prior security prompt.

4. The method of claim 1, further comprising, before the presenting:
via the interface, receiving from the user a selection of the at least one response-eligible passcode element; and
storing the selection of the at least one response-eligible passcode element in a memory of the electronic device.

5. A method, comprising:
by an electronic device, presenting a security prompt to a user, wherein the security prompt comprises a sequence of passcode elements, wherein the sequence comprises at least one response-ineligible passcode element and at least one response-eligible passcode element, wherein:
at least one of the response-eligible passcode elements comprises a first haptic emission;
at least one of the response-ineligible passcode elements comprises a second haptic emission that differs from the first haptic emission in length, frequency, or both length and frequency; and
presenting the security prompt to the user comprises causing the electronic device to emit the first and second haptic emissions;
receiving, via an interface of the electronic device, a response to the security prompt;
determining, by the electronic device, whether the response is a correct response by determining whether the response includes each of the response-eligible passcode elements and omits each of the response-ineligible passcode elements based on the length, frequency, or both length and frequency of inputs received via a touch-sensitive screen of the electronic device, and wherein the correct response comprises at least one of the following:
the sequence of passcode elements minus the response-ineligible passcode elements not defined by a corresponding proxy element; and
the sequence of passcode elements with a proxy element replacing each of the response-ineligible passcode elements that are defined by a corresponding proxy element; and
in response to receiving the correct response, permitting the user to access a function of the electronic device.

6. The method of claim 1, wherein the function comprises at least one of the following: an application, a website, a device hardware component, an electronic lock, and a remote mechanical component.

7. An electronic device, comprising:
a processor,
a user interface,
a memory containing programming instructions that, when implemented by the processor, cause the processor to implement a security function comprising:
presenting a security prompt to a user, wherein the security prompt comprises a sequence of passcode elements, wherein the sequence comprises at least one response-ineligible passcode element and at least one response-eligible passcode element wherein:
at least one of the response-eligible passcode elements comprises a first haptic emission;
at least one of the response-ineligible passcode elements comprises a second haptic emission that differs from the first haptic emission in length, frequency, or both length and frequency; and
presenting the security prompt to the user comprises causing the electronic device to emit the first and second haptic emissions;
detecting that the user interface has received a response to the security prompt;
determining whether the response is a correct response by determining whether the response includes each of the response-eligible passcode elements and omits each of the response-ineligible passcode elements based on the length, frequency or both length and frequency of inputs received via a touch-sensitive screen of the electronic device, and wherein the correct response consists of the sequence of passcode elements with a proxy element replacing each of the response-ineligible passcode elements; and
in response to receiving the correct response, permitting the user to access a device function of the electronic device.

8. The device of claim 7, wherein the security function also comprises:
before the presenting, using a randomization function to generate the security prompt.

9. The device of claim 7, wherein the security function also comprises:
before the presenting, ensuring that the security prompt does not match an immediately-prior security prompt.

10. The device of claim 7, wherein the security function also comprises:
before the presenting, via the interface, receiving from the user a selection of the at least one response-eligible passcode element; and
storing the selection of the at least one response-eligible passcode element in a memory of the electronic device.

11. The device of claim 7, wherein the device function comprises at least one of the following: an application, a website, a device hardware component, an electronic lock, and a remote mechanical component.

12. A security module for an electronic device, comprising a non-transitory computer-readable device containing program instructions that cause the electronic device to:
present a security prompt to a user, wherein the security prompt comprises a sequence of passcode elements, wherein the sequence comprises at least one response-ineligible passcode element comprising a first vibrating signal and at least one response-eligible passcode element comprising a second vibrating signal that differs from the first vibrating signal;
receive, via an interface of the electronic device, a response to the security prompt;
determine, by the electronic device, whether the response is a correct response by determining whether the response includes each of the response-eligible passcode elements and omits each of the response-ineligible passcode elements based on the length, frequency or both length and frequency of inputs received via a touch-sensitive screen of the electronic device, and wherein the correct response consists of the sequence of passcode elements with a proxy element replacing each of the response-ineligible passcode elements; and
in response to receiving the correct response, permit the user to access a function of the electronic device.

13. The security module of claim 12, wherein the device function comprises at least one of the following: an application, a website, a device hardware component, an electronic lock, and a remote mechanical component.

14. The security module of claim 12, wherein the instructions further comprise:
before the presenting, via the interface, receive from the user a selection of the at least one response-eligible passcode element; and
store the selection of the at least one response-eligible passcode element in a memory of the electronic device.

15. A security module for an electronic device, comprising a non-transitory computer-readable device containing program instructions that cause the electronic device to:
present a security prompt to a user, wherein the security prompt comprises a sequence of passcode elements, wherein the sequence comprises at least one response-ineligible passcode element comprising a first vibrating signal and at least one response-eligible passcode element comprising a second vibrating signal that differs from the first vibrating signal;

receive, via an interface of the electronic device, a response to the security prompt;
determine, by the electronic device, whether the response is a correct response by determining whether the response includes each of the response-eligible passcode elements and omits each of the response-ineligible passcode elements based on the length, frequency or both length and frequency of inputs received via a touch-sensitive screen of the electronic device, wherein the correct response comprises at least one of the following:
the sequence of passcode elements minus the response-ineligible passcode elements not defined by a corresponding proxy element; and
the sequence of passcode elements with a proxy element replacing each of the response-ineligible passcode elements that are defined by a corresponding proxy element; and
in response to receiving the correct response, permit the user to access a function of the electronic device.

16. The method of claim 1, wherein receiving the response to the security prompt comprises receiving a response via a touch-sensitive screen after each emission, wherein the response is correct if the response comprises:
a first number, length or frequency of inputs in response to the first haptic emission; and
a different number, length or frequency in response to the second haptic emission.

17. The device of claim 7, wherein the instructions that cause the processor to determine whether the response is correct comprise instructions to determine whether the response received via a touch-sensitive screen comprises:
a first number, length or frequency of inputs in response to the first haptic emission; and
a different number, length or frequency in response to the second haptic emission.

18. The method of claim 5, wherein receiving the response to the security prompt comprises receiving a response via a touch-sensitive screen after each emission, wherein the response is correct if the response comprises:
a first number, length or frequency of inputs in response to the first haptic emission; and
a different number, length or frequency in response to the second haptic emission.

19. The method of claim 5, further comprising, by the electronic device:
before the presenting, generating the security prompt, wherein the generating comprises using a randomization function to generate the security prompt.

20. The method of claim 5, further comprising:
before the presenting, generating the security prompt, wherein generating comprises ensuring that the security prompt does not match an immediately-prior security prompt.

21. The method of claim 5, further comprising, before the presenting:
via the interface, receiving from the user a selection of the at least one response-eligible passcode element; and
storing the selection of the at least one response-eligible passcode element in a memory of the electronic device.

22. The method of claim 5, wherein the function comprises at least one of the following: an application, a website, a device hardware component, an electronic lock, and a remote mechanical component.

23. An electronic device, comprising:
a processor,
a user interface,
a memory containing programming instructions that, when implemented by the processor, cause the processor to implement a security function comprising:
presenting a security prompt to a user, wherein the security prompt comprises a sequence of passcode elements, wherein the sequence comprises at least one response-ineligible passcode element and at least one response-eligible passcode element wherein:
at least one of the response-eligible passcode elements comprises a first haptic emission;
at least one of the response-ineligible passcode elements comprises a second haptic emission that differs from the first haptic emission in length, frequency, or both length and frequency; and
presenting the security prompt to the user comprises causing the electronic device to emit the first and second haptic emissions;
detecting that the user interface has received a response to the security prompt;
determining whether the response is a correct response by determining whether the response includes each of the response-eligible passcode elements and omits each of the response-ineligible passcode elements based on the length, frequency or both length and frequency of inputs received via a touch-sensitive screen of the electronic device, and wherein the correct response comprises at least one of the following:
the sequence of passcode elements minus the response-ineligible passcode elements not defined by a corresponding proxy element; and
the sequence of passcode elements with a proxy element replacing each of the response-ineligible passcode elements that are defined by a corresponding proxy element; and
in response to receiving the correct response, permitting the user to access a device function of the electronic device.

24. The device of claim 22, wherein the security function also comprises:
before the presenting, using a randomization function to generate the security prompt.

25. The device of claim 22, wherein the security function also comprises:
before the presenting, ensuring that the security prompt does not match an immediately-prior security prompt.

26. The device of claim 22, wherein the security function also comprises:
before the presenting, via the interface, receiving from the user a selection of the at least one response-eligible passcode element; and
storing the selection of the at least one response-eligible passcode element in a memory of the electronic device.

27. The device of claim 22, wherein the device function comprises at least one of the following: an application, a website, a device hardware component, an electronic lock, and a remote mechanical component.

28. The device of claim 22, wherein the instructions that cause the processor to determine whether the response is correct comprise instructions to determine whether the response received via a touch-sensitive screen comprises:
a first number, length or frequency of inputs in response to the first haptic emission; and
a different number, length or frequency in response to the second haptic emission.

29. The security module of claim 15, wherein the device function comprises at least one of the following: an application, a website, a device hardware component, an electronic lock, and a remote mechanical component.

30. The security module of claim 15, wherein the instructions further comprise:
   before the presenting, via the interface, receive from the user a selection of the at least one response-eligible passcode element; and
   store the selection of the at least one response-eligible passcode element in a memory of the electronic device.

\* \* \* \* \*